United States Patent [19]

Wimmer

[11] Patent Number: 5,359,518

[45] Date of Patent: Oct. 25, 1994

[54] PROCESS FOR MONITORING THE POWER OUTPUT OF THE INDIVIDUAL CYLINDERS OF A MULTICYLINDER INTERNAL COMBUSTION ENGINE

[75] Inventor: Wolfgang Wimmer, Erlenbach, Fed. Rep. of Germany

[73] Assignee: Audi AG, Ingolstadt, Fed. Rep. of Germany

[21] Appl. No.: 836,290

[22] PCT Filed: Aug. 23, 1990

[86] PCT No.: PCT/EP90/01410

§ 371 Date: Nov. 24, 1992

§ 102(e) Date: Nov. 24, 1992

[87] PCT Pub. No.: WO91/02892

PCT Pub. Date: Mar. 7, 1991

[30] Foreign Application Priority Data

Aug. 23, 1989 [DE] Fed. Rep. of Germany ....... 3927796
Mar. 22, 1990 [DE] Fed. Rep. of Germany ....... 4009285

[51] Int. Cl.⁵ .................. E02P 5/06; G06F 15/48; G06G 7/70
[52] U.S. Cl. ............. 364/431.03; 364/431.05; 364/431.01; 364/431.08; 123/435; 123/416; 73/115; 73/116
[58] Field of Search ........... 364/431.01, 431.03, 364/431.08, 551, 431.04; 73/116, 115, 862; 123/419, 416, 435, 436

[56] References Cited

U.S. PATENT DOCUMENTS

| | | | |
|---|---|---|---|
| 4,301,678 | 11/1981 | Full et al. | 73/116 |
| 4,539,841 | 9/1985 | Schroeder et al. | 73/116 |
| 4,562,728 | 1/1986 | Timmerman | 73/116 |
| 4,841,933 | 6/1989 | McHale et al. | 123/419 |
| 4,843,556 | 6/1989 | Wakeman et al. | 364/431.08 |
| 4,893,244 | 1/1990 | Tang et al. | 364/431.03 |
| 4,899,282 | 2/1990 | Holmes | 364/431.08 |
| 5,001,645 | 3/1991 | Williams et al. | 364/431.08 |
| 5,132,909 | 7/1992 | Schroeder et al. | 364/431.03 |

FOREIGN PATENT DOCUMENTS

| | | |
|---|---|---|
| 2507057 | 9/1976 | European Pat. Off. |
| 107523 | 5/1984 | European Pat. Off. |
| EP306905 | 3/1989 | European Pat. Off. |
| 2346333 | 3/1975 | Fed. Rep. of Germany |
| 2507286 | 8/1975 | Fed. Rep. of Germany |
| 2601871 | 8/1976 | Fed. Rep. of Germany |
| 2625971 | 12/1977 | Fed. Rep. of Germany |
| 2830674 | 2/1979 | Fed. Rep. of Germany |
| 2830048 | 9/1979 | Fed. Rep. of Germany |
| 2838927 | 3/1980 | Fed. Rep. of Germany |
| 2845354 | 5/1980 | Fed. Rep. of Germany |
| 2902815 | 8/1980 | Fed. Rep. of Germany |

(List continued on next page.)

OTHER PUBLICATIONS

SAE Paper–Misfired Detection by Evaluating Cranshaft Speed–A Means to Comply with OBDII (M. Klenk and W. Moser) (W. Mueller and Wolfgang Wimmer) Mar. 1993.

*Primary Examiner*—Thomas G. Black
*Assistant Examiner*—Jacques Harold Louis-Jacques
*Attorney, Agent, or Firm*—Kane, Dalsimer, Sullivan, Kurucz, Levy, Eisele & Richard

[57] ABSTRACT

A method for monitoring the power output of individual cylinders of a multicylinder internal combustion engine including considering the influence of dynamic engine operation, either braking or acceleration, in the recognition of combustion misfires. The effect of dynamic engine operation and incorrect diagnosis of combustion misfires is avoided by dynamic compensation. Only one value is needed of an instantaneous speed per ignition top dead center of each engine cylinder, whereby the speed values can be acquired over the duration of the crank angle rotation about big crank angle ranges which correspond to the distance between successive ignitions.

15 Claims, 9 Drawing Sheets

FOREIGN PATENT DOCUMENTS

| | | |
|---|---|---|
| 3111988 | 1/1982 | Fed. Rep. of Germany . |
| 3139000 | 5/1982 | Fed. Rep. of Germany . |
| 3140737 | 4/1983 | Fed. Rep. of Germany . |
| 3420465 | 12/1984 | Fed. Rep. of Germany . |
| 3424692 | 2/1986 | Fed. Rep. of Germany . |
| 3609245 | 10/1986 | Fed. Rep. of Germany . |
| 3615547 | 11/1986 | Fed. Rep. of Germany . |
| 3802803 | 8/1988 | Fed. Rep. of Germany . |
| 3743160 | 9/1988 | Fed. Rep. of Germany . |
| 3724420 | 2/1989 | Fed. Rep. of Germany . |
| 3828733 | 3/1989 | Fed. Rep. of Germany . |
| 3828735 | 3/1989 | Fed. Rep. of Germany . |
| 3913464 | 11/1989 | Fed. Rep. of Germany . |
| 3917580 | 12/1989 | Fed. Rep. of Germany . |
| 3924224 | 1/1990 | Fed. Rep. of Germany . |
| 3924575 | 2/1990 | Fed. Rep. of Germany . |
| 3924756 | 2/1990 | Fed. Rep. of Germany . |
| 3927050 | 3/1990 | Fed. Rep. of Germany . |
| 58-222903 | 12/1983 | Japan . |
| 63-124842 | 5/1988 | Japan . |

PROCESS FOR MONITORING THE POWER OUTPUT OF THE INDIVIDUAL CYLINDERS OF A MULTICYLINDER INTERNAL COMBUSTION ENGINE

BACKGROUND OF THE INVENTION

The invention relates to a method for monitoring the power output of the individual cylinders of a multi-cylinder internal combustion engine, for example in order to be able to identify combustion misfires in one or more cylinders in mixture compression internal combustion engines, and cylinders with different energy output in diesel combustion engines, resulting in poor idle quality and poor quiet running.

Combustion misfires in mixture compression internal combustion engines with lambda control and exhaust gas catalytic converter can result in significant thermal damage of the catalytic converter, if subsequent reactions of the non-burned fuel-air mixture occur in the exhaust gas tract as a result. High catalytic converter temperatures also represent a fire hazard for the vehicle. In addition, the exhaust gas quality is significantly worsened by combustion misfires, independent of whether the cause for the combustion misfires is found in errors of fuel measurement or of firing.

Methods for the detection of combustion misfires are already known, which are based on an analysis of the progression of the instantaneous speed of the internal combustion engine, i.e. the angular velocity of the crank shaft during a cycle. Combustion misfires result in special speed progression changes as compared with the normal state. In this method, the instantaneous speed is determined from the time during which the crank shaft rotates around a defined crank shaft angle range. The determination of these crank shaft ranges is carried out using markings on a wheel driven by the crank shaft. Usually, these markings are formed on the flywheel by the teeth of the starter gear crown, but a separate disk driven by the crank shaft can also be provided with markings. The markings generate a corresponding signal in an inductive transducer. The time measurement takes place by counting the pulses of a pulse transmitter which fall within the crank shaft angle range. The determination of the phase position which is necessary for assignment of the individual cylinders is carried out by means of a phase signal, which is triggered once per cycle (in the case of four-stroke internal combustion engines, with two revolutions of the crank shaft per cycle, e.g. by the cam shaft).

The known methods use a progression of the instantaneous speed which is highly resolved via the crank shaft angle. There, the time duration of very narrow crank shaft angle ranges is determined, which makes high cycle rates necessary for the pulse transmitter, in view of the required accuracy. In the method described in U.S. Pat. No. 4,532,592, crank shaft angle ranges of 6° are scanned with a pulse rate of 5 MHz. However, disruptive influences due to cyclical variations in the combustion progression as well as due to production tolerances of the gear crown represent significant problems in such high-resolution instantaneous speed values.

The same problems occur in the method pursuant to DE-A 28 38 927, in which a cylinder-selective comparison of the reference/actual output is carried out on the basis of the high-resolution instantaneous angular velocity, i.e. the angular acceleration.

In DE-A 37 24 420, a method is described, in which instantaneous speed values within a motor cycle are determined at least twice as often as corresponds to the number of cylinders, and combustion misfires are recognized by a comparison of minimum and maximum values assigned to each cylinder. This method requires a great amount of calculation effort.

In a similar method pursuant to DE-A 36 15 547, differences are formed for each cylinder from maximum and minimum instantaneous speed values assigned to each cylinder. To recognize combustion misfires, the difference value of a cylinder is placed in a ratio with the difference value of the previous cylinder in the firing sequence in each case, and a check is carried out to see whether this ratio is below a threshold. If, however, combustion misfires occur in two consecutive cylinders, the misfire in the second cylinder cannot be determined with this method.

A major disadvantage of the known methods consist of the fact that the influence of dynamic engine operation (acceleration, braking) is not taken in consideration in the recognition of combustion misfires.

SUMMARY OF THE INVENTION

The invention is based on the task of creating a method for monitoring the power output of the individual cylinders of a multi-cylinder internal combustion engine, with which a change in the power output of a cylinder, caused by combustion misfiring or poor combustion, is reliably recognized, with simultaneous avoidance of misrecognitions, especially also during dynamic driving operation, so that corresponding countermeasures can be provided, such as interruption of the fuel supply of the misfiring cylinder in order to avoid catalytic converter damage due to afterburning, and, to protect the vehicle, indication of the error with an alarm light on the dashboard to warn the driver, and storage of the error in memory, for service diagnosis.

This task is accomplished, according to the invention, by the characterizing features indicated in claim 1.

The method according to the invention proceeds from the following simplified physical consideration:

The gas forces which occur during combustion in each cylinder generate a torque at the crank shaft which performs work at the crank shaft during the rotation around a crank shaft angle range. This crank shaft angle range extends maximally from the ignition top dead center of the cylinder in question, until the following bottom dead center. If combustion does not take place, this work is not performed, and accordingly, the rotation energy of the crank shaft drive and the flywheel mass drops in this crank shaft angle range. The rotation energy is proportional to the square of the instantaneous speed of the internal combustion engine.

In the method according to the invention, it is not the instantaneous speed, i.e. the angular velocity or its time derivation (acceleration) that is investigated, as in the known methods, but rather the drop in the square of the instantaneous speed within the stated crank shaft angle range. Since a corresponding angle range can be assigned to each cylinder of the internal combustion engine, monitoring of the power output of each individual cylinder is guaranteed.

At constant cylinder filling, the decrease in $n^2$ in case of a combustion misfire is independent of the (average) motor speed, because the same amount of work is missing at the crank shaft in each case. This means a significant simplification with regard to determination of recognition thresholds, as compared with an analysis of the instantaneous speed progression, which makes thresholds greatly dependent on speed necessary.

In the method according to the invention, an instantaneous speed square value is determined for each cylinder during each cycle of the engine. The decrease in power, i.e. $n^2$, to be checked results as the difference of the $n^2$ values of consecutive cylinders in the firing sequence. Thus, only as many values as correspond to the number of cylinders of the internal combustion engine are determined per cycle of the internal combustion engine.

In this, each $n^2$ value is calculated from the time duration of a suitably selected crank shaft angle range. The time duration results from the number of pulses of a pulse transmitter within the crank shaft angle range, which can be determined using the gear signal of the flywheel gear crown and a phase signal, for example, as is known. Since a crank shaft angle range for the determination of $n^2$ is assigned to each cylinder, the ranges follow each other at the firing interval.

In the method according to the invention, in contrast to known methods, broad crank shaft angle ranges are used. The width is to be selected at least so large that counting pulse rates which can be practically and easily implemented (e.g. 1 MHz) are sufficient for the time measurement, and that disruptive influences, for example due to cyclical variations, production tolerances of the gear crown, and retroactive unevenness in the road, are eliminated. In the upward direction, the width of the crank shaft angle ranges is limited by the requirement that a drop in $n^2$ remains clearly recognizable in case of a combustion misfire.

Preferably, the determination of the instantaneous speed takes place over a crank shaft angle range corresponding to the firing interval. In this manner, the angle ranges of consecutive cylinders border one another, which causes the number of necessary crank shaft angle markings (for example gear signal flanks) to be reduced in half, since the end of each crank shaft angle range coincides with the beginning of the next one.

An essential characteristic of the method according to the invention is the fact that it takes into consideration the influence of dynamic engine operation on the progression of $n^2$, because in case of acceleration, the increase in $n^2$ due to acceleration is superimposed on any decrease in $n^2$ due to a misfire, which makes it more difficult or even impossible to recognize a misfire, depending on the degree of acceleration. On the other hand, even when an engine is operating without errors, a decrease in $n^2$ occurs during braking, which could lead to an incorrect diagnosis of combustion misfires. The method according to the invention therefore contains dynamic compensation. For this, the mean linear increase in $n^2$ (for acceleration) or decrease in $n^2$ (for braking) within each cycle is subtracted from the actual $n^2$ progression within that cycle of the internal combustion engine, so that the change provoked by acceleration or braking of the vehicle engine is eliminated. Then, the difference between the corrected $n^2$ value at the ignition top dead center of this cylinder and the corrected $n^2$ value at the ignition top dead center of the next cylinder in the firing sequence is formed, and the difference values are compared with predetermined thresholds. For this, thresholds for each individual combustion or for combustion events brought together in groups, for example for an entire engine cycle, are used.

An error diagnosis takes place if a critical relative frequency of exceeding the threshold occurs at one or more cylinders.

Preferably, the thresholds are determined as a function of the load and speed of the internal combustion engine in a characteristic map, since the gas force is less at partial load than at full load, and therefore the energy shortage which occurs in case of a combustion misfire is also less, so that the threshold has to be lower than at full load, and the friction forces are dependent on speed.

In a preferred form of the method according to the invention, a pilot control is used, before an inquiry of the difference values for each cylinder with regard to exceeding the threshold takes place. This pilot control has the task of eliminating incorrect recognitions, i.e. triggering of an error message in spite of proper combustion, insofar as is possible. Particularly in borderline situations, which deviate from normal driving operation, incorrect recognitions can often occur. Thus, rapid load increases, for example if the throttle is suddenly opened more suddenly, can put the internal combustion engine and the drive train into aperiodic oscillation, which is superimposed on the progression of the crank shaft speed. This oscillations, which cannot be avoided, can lead to an incorrect recognition of "combustion misfires," which becomes critical in its frequency if the sudden stepping on the gas is repeated several times in rapid succession. Borderline situations can also occur due to improper use of the clutch pedal, causing the crank shaft speed to experience great acceleration or braking, and the subsequent aperiodic oscillations to occur.

The pilot control of the method according to the invention now functions in such a way that the change in load and/or speed is calculated within a time that can be predetermined, the calculated change is compared with a limit that can be predetermined, and in case a limit is exceeded, the predetermined threshold is increased over a time period that can be predetermined. With these measures, incorrect recognitions can be avoided in simple manner, since both the load signal and the crank shaft speed, as is known for digital engine control systems, can be easily checked for rapid changes with reference to time or crank shaft angle. Alternatively, for determining large rpm changes, the mean change in the square of the speed calculated during each engine cycle can be used. The level of the limits for triggering the pilot control in each case is selected in such a way, in each case, that the recognition of combustion misfires which actually occur is not restricted. In order to ensure optimum error recognition, the limits which can be predetermined and/or the time duration of the threshold increase, which can be predetermined, are established as a function of the operating state of the internal combustion engine.

In an advantageous form of the method according to the invention, the thresholds are precontrolled in such a way that after the instantaneous speed and/or the instantaneous load has been compared with upper and/or lower limits which can be predetermined, the predetermined threshold is increased over a time duration that can be predetermined, in case the value goes below a lower limit or above an upper limit. The result achieved with these measures is that incorrect recognitions which frequently occur in borderline ranges of the engine operation characteristic map are suppressed. This is useful, for example, in the range of an upper speed limitation, in which the fuel supply is interrupted, or during coasting with fuel shut-off. Another limit range exists if the engine speed drops far below the idle speed, which happens, in particular, if a slowly rolling vehicle is improperly put into a high gear. In this operating state, the power outputs of the individual cylinders vary so greatly that an exact error recognition is no longer possible.

In another advantageous form of the method according to the invention, changes in the thresholds from high to low values are limited in their speed. For this, the difference values between consecutive thresholds are continuously formed, and in case of a dropping threshold, the difference value is compared with difference limits that can be predetermined. If a difference limit is exceeded, the change velocity of the thresholds is limited in such a way that the drop from one threshold to the next corresponds to the difference limit that can be predetermined, as a maximum. The difference limits can be predetermined as a function of the engine operating state. With this, it is possible to suppress incorrect recognitions on the basis of the aperiodically damped speed oscillations (e.g. as the result of a gas surge), as already described above. In the same way, incorrect recognitions which would occur in case of a rapid load drop are eliminated, if the test variables which characterize the combustion take on smaller values with a delay, and the thresholds corresponding to the lesser load state would therefore be exceeded.

The method according to the invention can be implemented without additional sensors, by corresponding expansion of the digital engine control devices usually used today, in which the gear signal and the phase signal are already available for control of the firing of the individual cylinders, and of the fuel injection.

Device for implementing the method according to the invention are indicated in claims 9 to 13.

Embodiments of the invention are described in the following, with reference to the drawings

DESCRIPTION OF THE PREFERRED EMBODIMENTS

Figure 1:
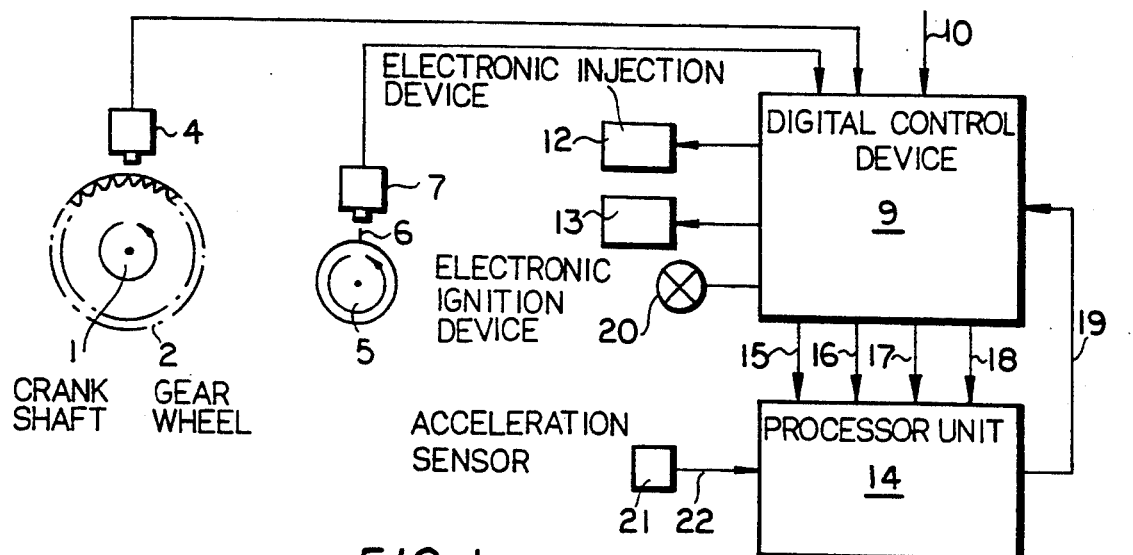
FIG. 1 is a schematic representation of an electronic control system with combustion misfire recognition for a mixture compression multi-cylinder internal combustion engine.
Figure 2:
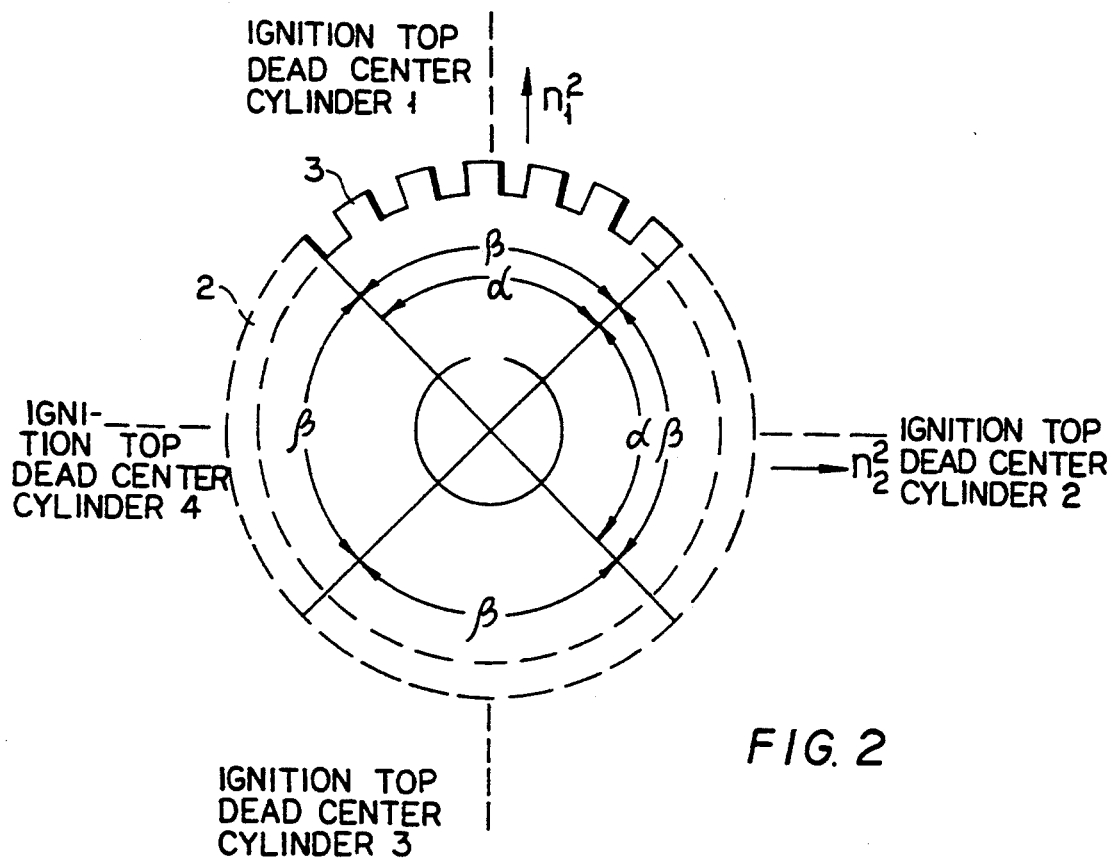
FIG. 2 is a schematic representation of the starter gear crown of the internal combustion engine.

In FIG. 1, 1 refers to the crank shaft of a four-stroke internal combustion engine, on which a gear wheel 2 is attached, the teeth 3 (FIG. 2), i.e. tooth flanks of which interact with a first sensor 4 as signal transmitters. In FIG. 2, $\beta$ refers to the firing interval between consecutively firing cylinders. In this embodiment, the segment width $\alpha$ for the determination of the instantaneous speed is equal to the firing interval. In this case, the end of each crank shaft angle range $\alpha$ coincides with the beginning of the next one, so that only a number of markings which corresponds to the number of cylinders has to be provided. However, the segment width $\alpha$ can also deviate from the firing interval $\beta$.

The crank shaft 1 drives a cam shaft 5, which carries a phase marker 6, which interacts with a second sensor 7, at half the crank shaft speed. The sensor 4 passes the gear signal to a digital control device 9. The second sensor 7 receives a signal from the phase marker 6 after every revolution of the cam shaft 5, in other words after every second revolution of the crank shaft 1, which is also passed to the control device 9. The control device 9, which receives a load-dependent signal over a line 10, determines the injection quantity and the firing time point for each cylinder from the input signals, and transmits corresponding signals to an electronic injection device 12 and an electronic ignition device 13. To this extent, the device according to FIG. 1 corresponds to a known digital motor control. In addition, a processor unit 14 is provided, which receives the gear signal from the first sensor 4 over first line 15, the phase signal from the second sensor 7 over a second line 16, the engine speed signal over a third line 17, and the engine load signal over a fourth line 18. The third line 17 could also be eliminated, since the crank shaft speed is already calculated within the processor unit via the gear signal and the phase signal in each case. Furthermore, an acceleration sensor 21 is connected to the processor unit 14 via a fifth line 22.

Figure 4:
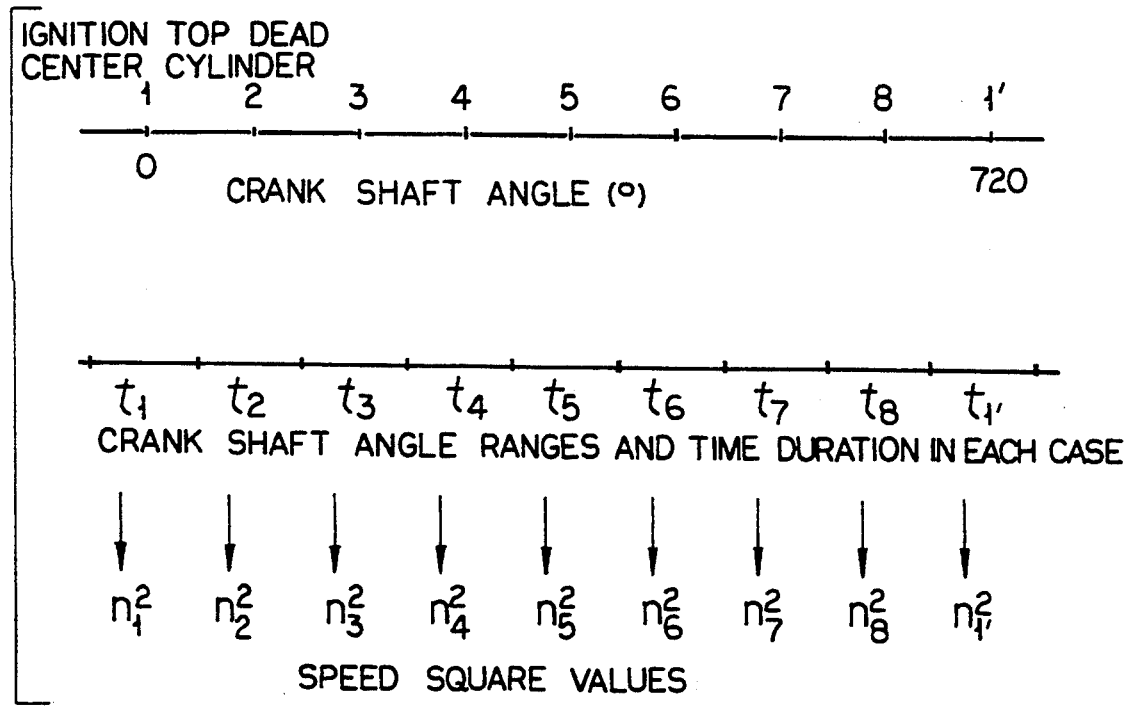
FIG. 4 shows the position and the time duration of the crank shaft angle ranges and the $n^2$ values calculated from them for a cycle of an 8-cylinder four-stroke internal combustion engine.

In the processor unit 14, the crank shaft angle range $\alpha$ (FIG. 2) is determined for each cylinder, from the gear signal and the phase signal, with the time duration being determined by counting the pulses of a pulse transmitter present in the processor unit which fall within it, and for each cylinder, the instantaneous speed is calculated from the time duration, and its square $n^2$ is formed, as shown schematically in FIG. 4. Here, $n_1^2$ stands for the instantaneous speed square value for the cylinder 1 before work performance by the gas force, $n_2^2$ stands for the corresponding value for the cylinder 2, which simultaneously represents the $n^2$ value for the cylinder 1 after work performance by its gas force, etc. Any power decrease in the cylinder 1 due to combustion misfire is covered by the difference $$(\Delta n^2)_1 = n_1^2 - n_2^2$$

where this value is positive in case of a decrease in $n^2$.

In stationary engine operation, the variables $(\Delta n^2)_i$ ($i=1 \ldots z$, $z=$ number of cylinders of the internal combustion engine) can be used for recognition of combustion misfires, since in the case of a misfire in the cylinder $i$, the value of $(\Delta n^2)_i$ exceeds a threshold. For reliable recognition of combustion misfires in dynamic engine operation, however, a correction is necessary, since an increase in $n^2$ takes place during acceleration, which is superimposed on a decrease in $n^2$ caused by a misfire. Since a decrease in $n^2$ occurs, on the other hand, during braking, this could lead to an incorrect diagnosis when the engine was running without problems.

In order to compensate these dynamic influences, the mean linear increase or decrease in $n^2$ during a cycle is subtracted from the $n^2$ progression during each cycle of the internal combustion engine. If the instantaneous speed square values for the first cylinder are designated as $n_1^2$ and $n_1'^2$, the formula $$\Delta_{AS}n^2 = n_1'^2 - n_1^2$$

indicates the mean dynamic change in $n^2$ during the first of the two cycles.

The corrected test variables $f_i$ for the individual cylinders for recognition of combustion misfires are therefore $$f_i = n_i^2 - \frac{i-1}{z}\Delta_{AS}n^2 - \left(n_{i+1}^2 - \frac{i}{z}\Delta_{AS}n^2\right)$$

$$= (\Delta n^2)_i + \frac{1}{z}\Delta_{AS}n^2$$

$i=1 \ldots z$ ($z$:number of cylinders).

The mean linear change in $n^2$ within an engine cycle can also be formed from the instantaneous speed square values for a different cylinder than the first cylinder, in two consecutive cycles. In general, the speed square values of another cylinder can be used, in each case, to calculate the mean linear change in $n^2$ within two engine rotations, for correction of the variables $(\Delta n^2)_i$.

Figure 3:
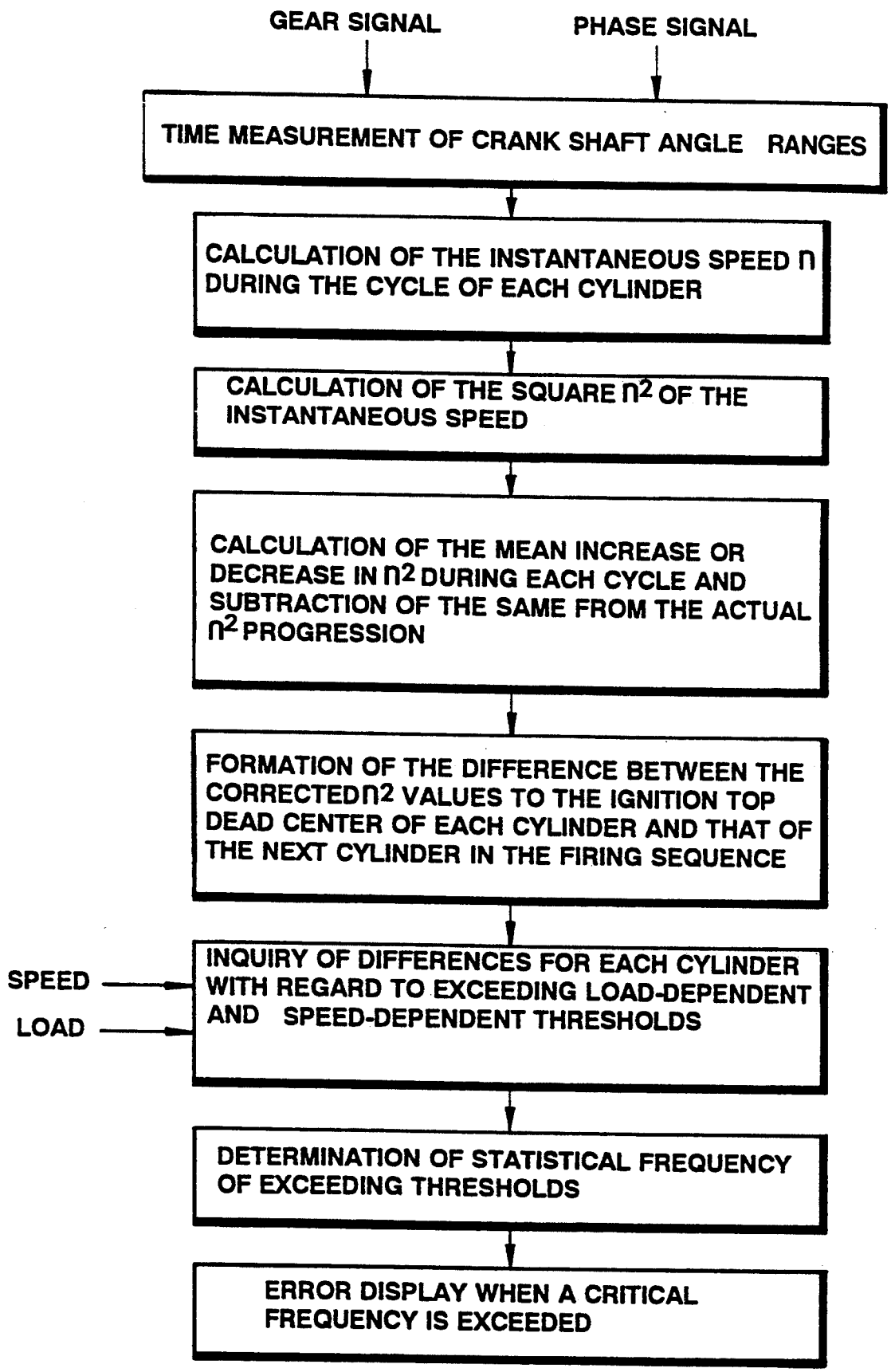
FIG. 3 shows the program sequence in the processor unit for recognition of combustion misfires.

FIG. 3 shows the program sequence in the processor unit 14. If combustion misfires are determined by the processor unit at a greater frequency than the critical frequency, it passes a signal to the control device 9 via a line 19, causing an error warning light 20 to light up and/or other measures to be initiated.

Figure 5:
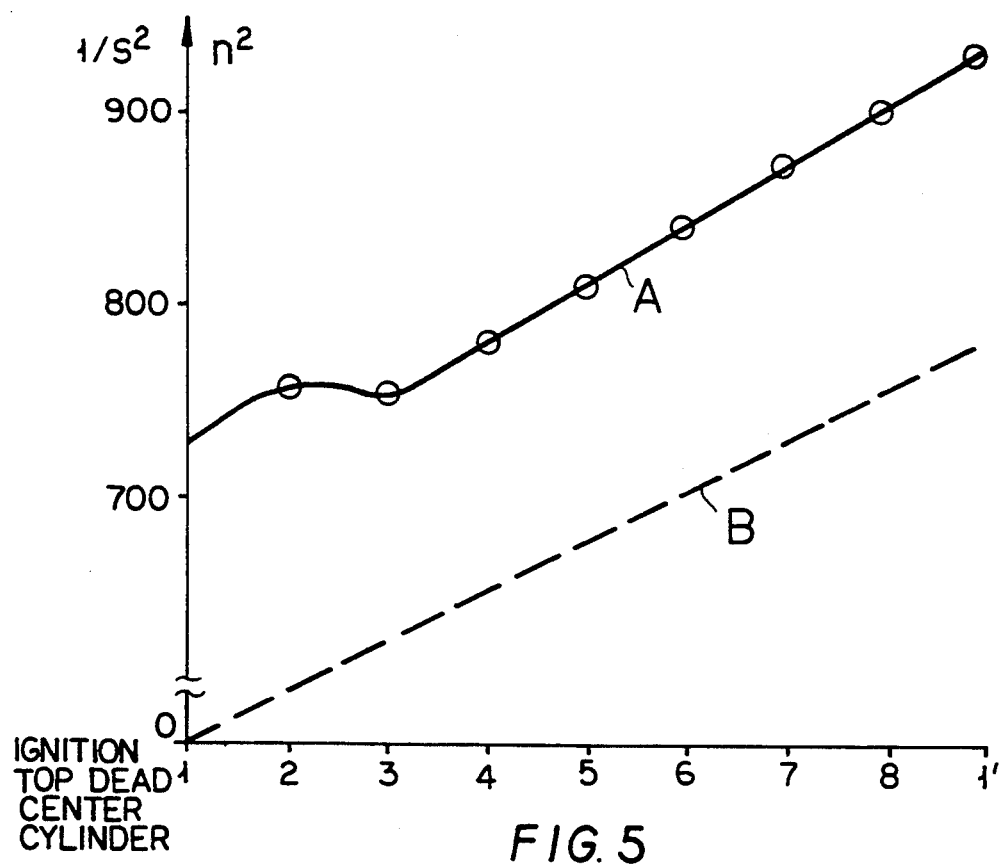
FIG. 5 is a diagram from which the progression of the square of the instantaneous speed during a cycle of an 8-cylinder four-stroke internal combustion engine without dynamic compensation is evident.

In FIG. 5, A represents the $n^2$ progression during a cycle of an 8-cylinder four-stroke internal combustion engine during an acceleration event, where it is assumed that no combustion takes place in the cylinder 2. The decrease in $n^2$ after the cylinder 2 has the increase in $n^2$ due to the acceleration method superimposed on it and is therefore not very marked.

Figure 6:
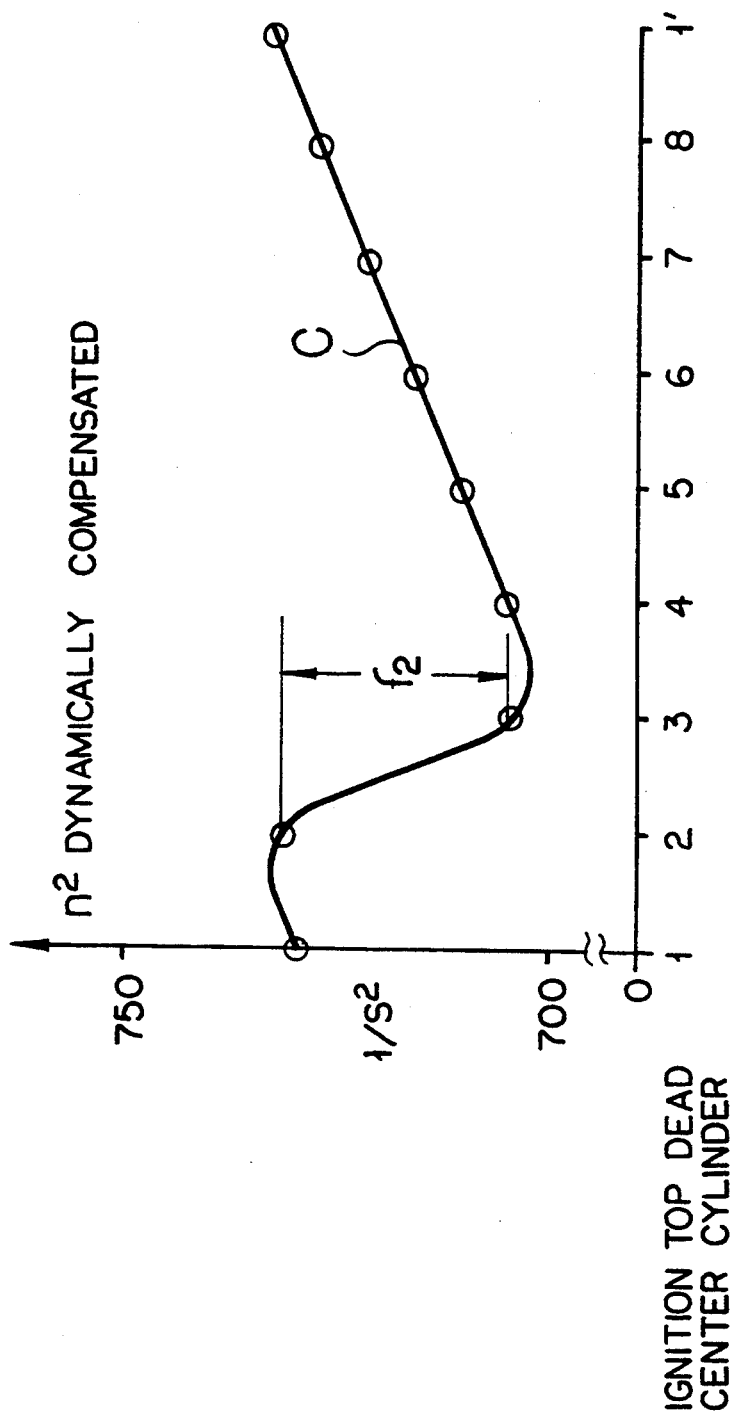
FIG. 6 is a diagram corresponding to FIG. 5, but with dynamic compensation of the progression of the square of the speed over a cycle.

In order to achieve unambiguous recognition of misfires, the mean linear increase in $n^2$ is calculated during every cycle of the internal combustion engine. This mean linear progression is illustrated with the curve B. If the linear increase in $n^2$ pursuant to curve B (or the corresponding decrease in $n^2$ in case the vehicle is braked) is subtracted from the actual progression of $n^2$, the curve A, the dynamic compensation progression of $n^2$, the curve C, as shown in FIG. 6, is obtained, clearly showing a misfire in the cylinder 2.

It should still be noted that in FIG. 2, 4, 5 and 6, the cylinders were numbered consecutively in their firing sequence, and not corresponding to their arrangement, as is usual.

Figure 7:
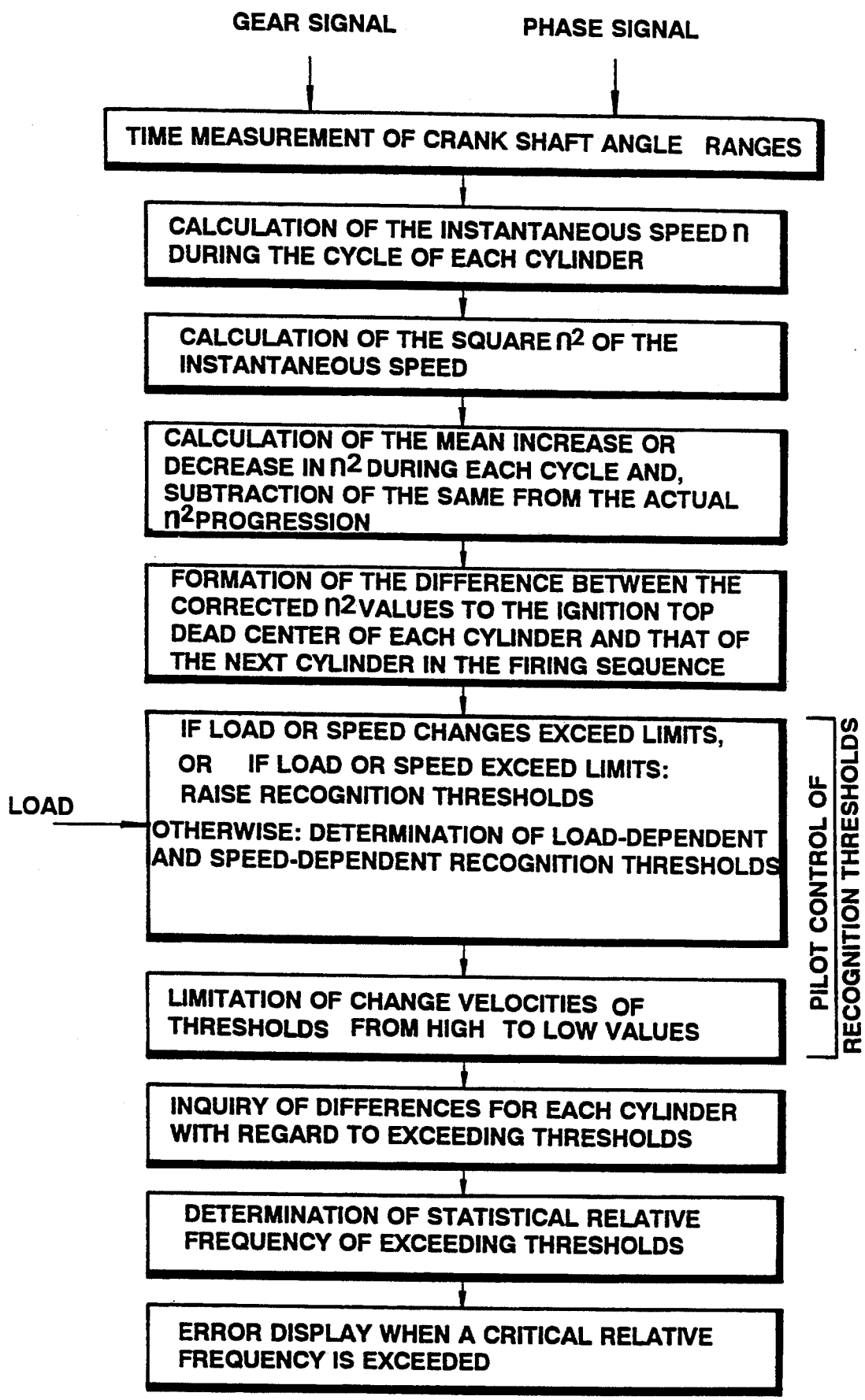
FIG. 7 shows the program sequence in the processor unit for recognition of combustion misfires, with pilot control of the recognition thresholds arranged in between, FIG. 8a is a diagram from which the progression of the engine load over several cycles of an 8-cylinder four-stroke internal combustion engine, resulting from a gas surge, is evident.

The program sequence in the processor unit for recognition of combustion misfires as shown in FIG. 7 differs from the program sequence shown in FIG. 3 in that a pilot control of the recognition thresholds is used. This pilot control starts after the formation of the difference between the corrected $n^2$ values to the ignition top dead center of each cylinder and that of the next cylinder in the firing sequence. Within the pilot control, a check is carried out as to whether the load or speed changes are exceeding limits, or whether the load or speed themselves go above or below limits. In this case, the recognition threshold is set artificially high. In this, the limits can be predetermined as a function of the load and the speed. If the limits are not exceeded, the load-dependent and speed-dependent recognition thresholds are determined, as in the program sequence pursuant to FIG. 3. Then the change velocity of the thresholds from high to low values are limited for the case that the difference of consecutive thresholds exceeds a predetermined difference limit. The subsequent program sequence then corresponds to the progression shown in FIG. 3.

Figure 8A:
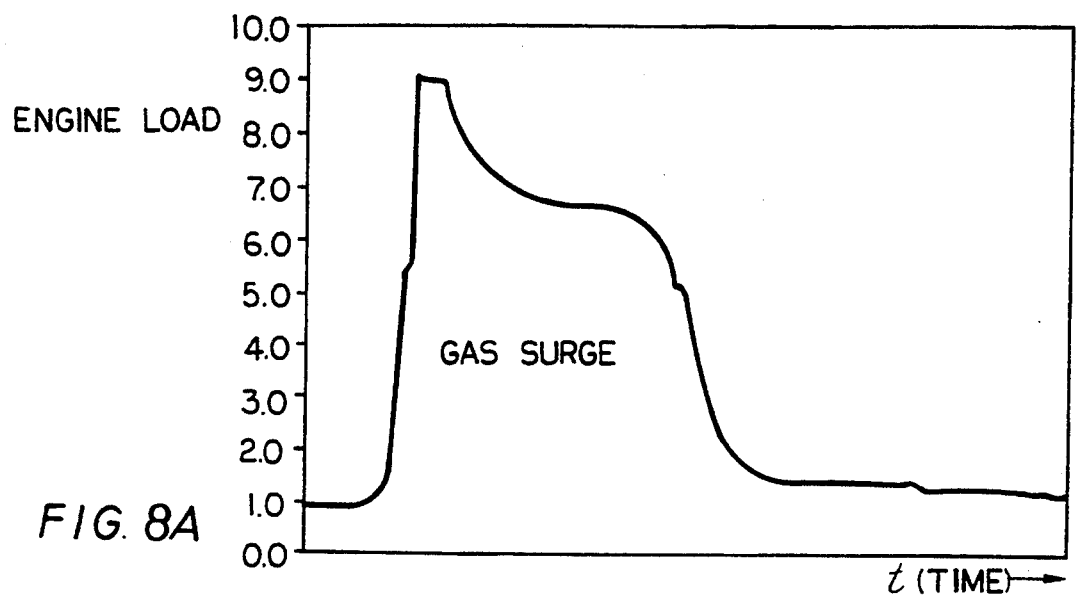
FIG. 8b is a diagram that shows the progression of the crank shaft angle speed corresponding to FIG. 8a, FIG. 8c shows a diagram from which the progression of the thresholds determined, with pilot control measures, is evident.
FIG. 8d shows a diagram from which the progression of the thresholds determined, without pilot control measures, is evident.
Figure 8B:
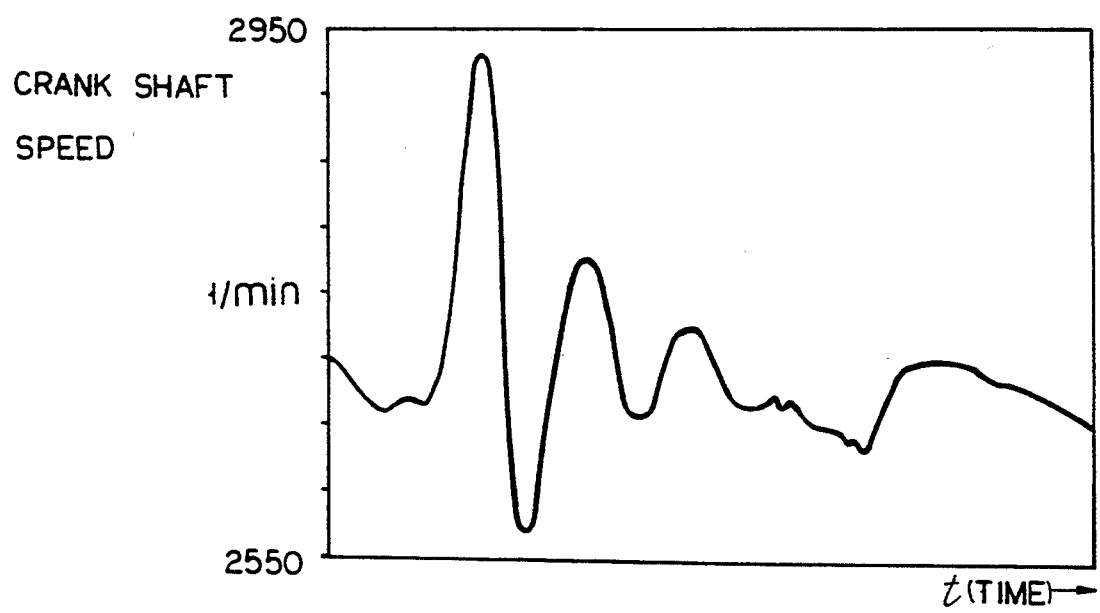
Figure 8C:
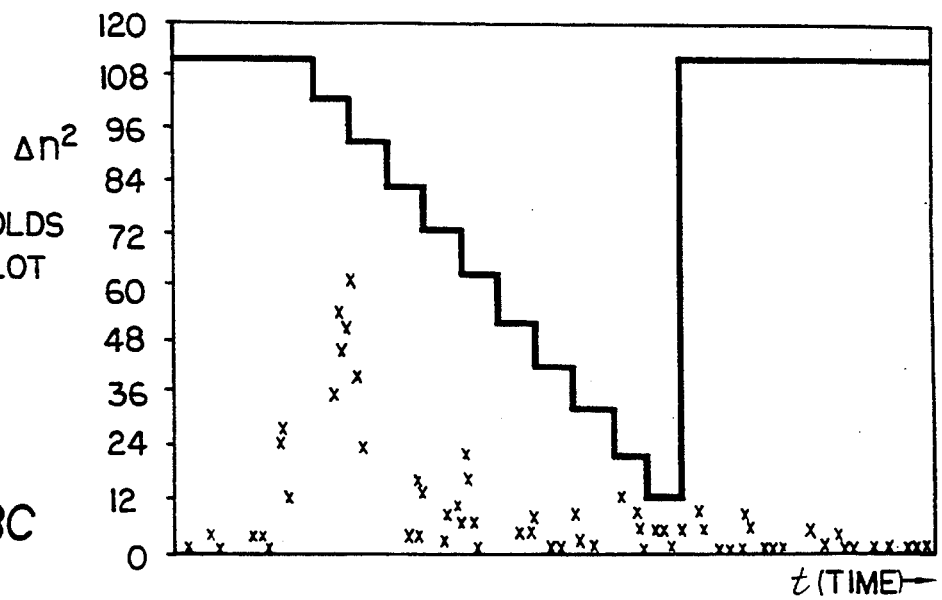
Figure 8D:
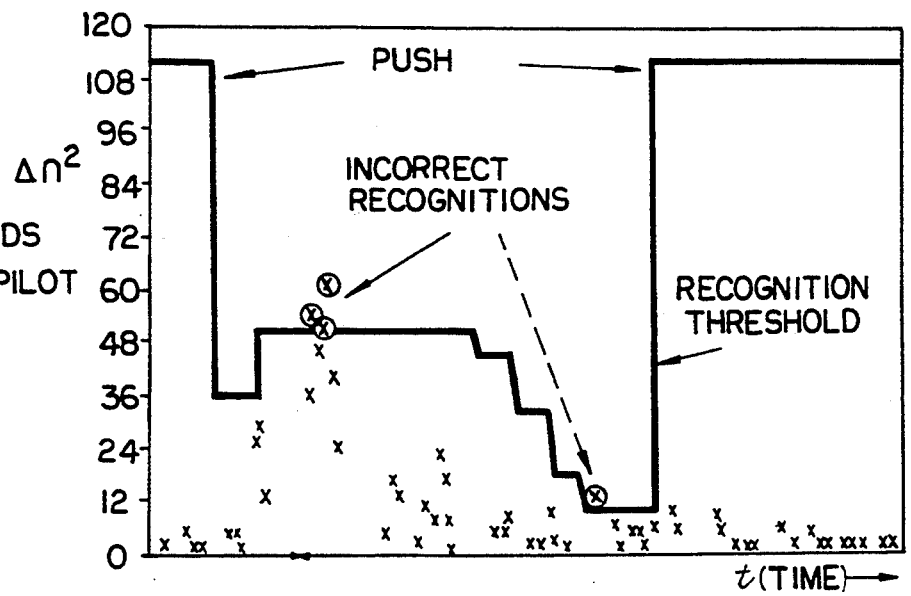

FIG. 8a shows the progression of the engine load as the result of a sudden gas surge over time (cycle) of the internal combustion engine. The progression of the engine load is characterized by a very steep increase in the front range, which dies out after a transition phase, into a horizontal range, and then drops sharply again after a short time. The influence of this gas surge on the progression of the crank shaft speed is shown in the diagram above this one (FIG. 8b). A great increase in the speed, corresponding to the great increase in the engine load, is clearly evident. This steep increase then dies out again during the progression of an aperiodic oscillation. The $\Delta n^2$ values calculated for this crank shaft speed progression are represented by crosses in the two diagrams above (FIG. 8c, d). The solid line shows the threshold determined per cycle of the internal combustion engine in the present embodiment, in each case. If the predetermined thresholds for normal driving operation are used as the basis, the progression shown in FIG. 8d is obtained. During the cycles following the load increase, however, incorrect recognitions occur, which are attributable to the damping of the rpm oscillations which occur as the result of the gas surge.

This incorrect recognition of "combustion misfires" becomes problematic with regard to exceeding the critical frequency if the sudden stepping on the gas is repeated several times at short intervals. The danger then exists that the error indicator will be triggered, without the critical frequency threshold of the combustion misfires actually having been exceeded.

FIG. 8c shows how this problem can be countered by means of the pilot control of the thresholds. Thus, in the range of the great load increase, i.e. of the great increase in crank shaft speed, the threshold is increased and regulated downwardly in stair-step form over the course of further cycles, where a constant threshold is the basis for each cycle. In the example pursuant to FIG. 8c, the limitation of the change velocity of the thresholds takes place by means of a difference limit of 10 for consecutive thresholds, and can take place as a function of the operating state of the internal combustion engine.

Figure 9:
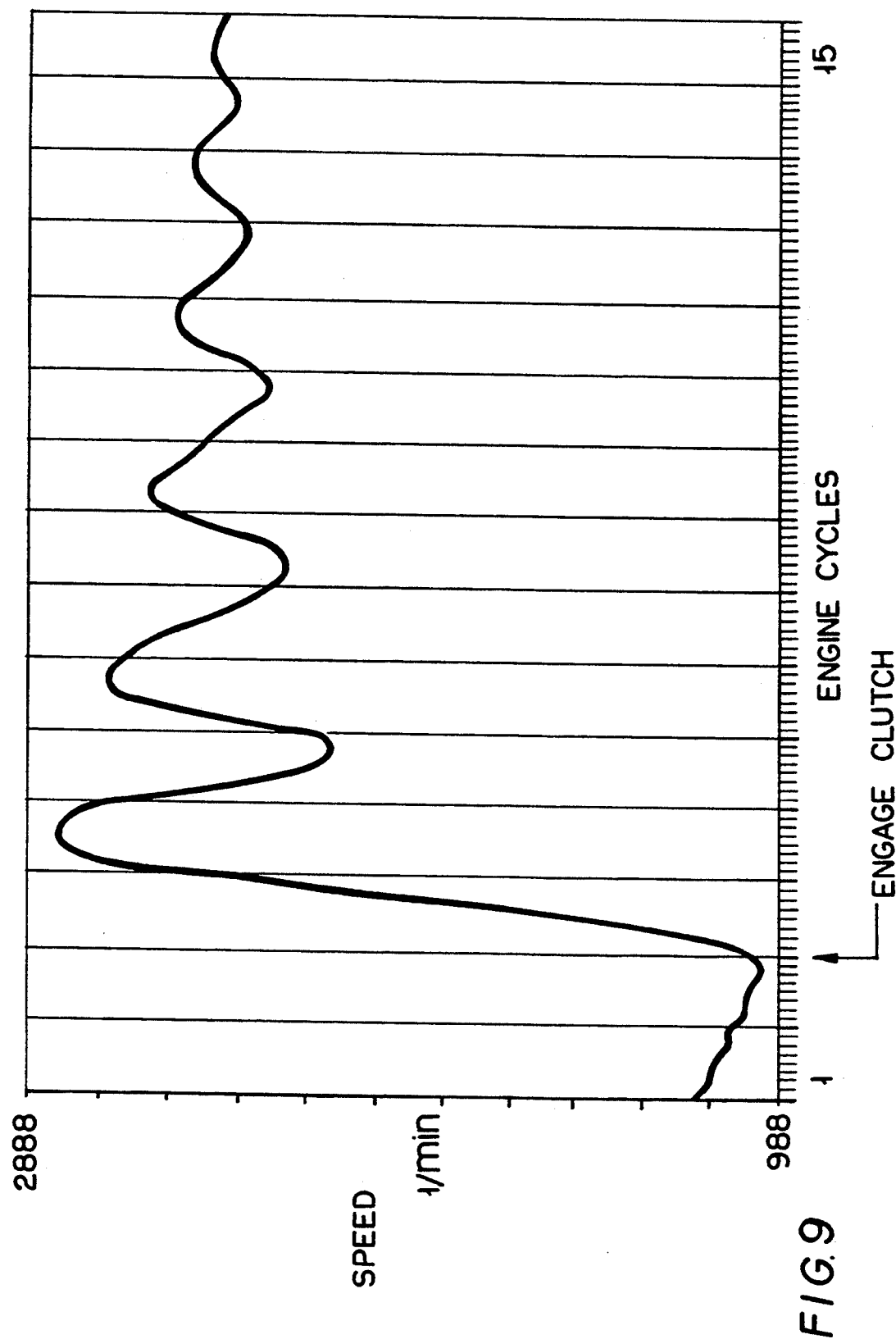
FIG. 9 shows a diagram from which the progression of the crank shaft speed during improper clutch operating in the lower speed range is evident.

FIG. 9 shows another borderline situation, in which a rapid increase in the speed occurs, with subsequent aperiodic oscillation, in which incorrect recognitions can occur, as already explained above. The progression of the speed is shown, as it adjusts when the vehicle rolls without being in gear for an extended period of time, so that the idle speed is almost reached, and the clutch is then engaged improperly. Even in this case, incorrect recognition can be avoided by the use of the pilot control measures described above, especially by monitoring whether the speed change exceeds a limit.

Figure 10:
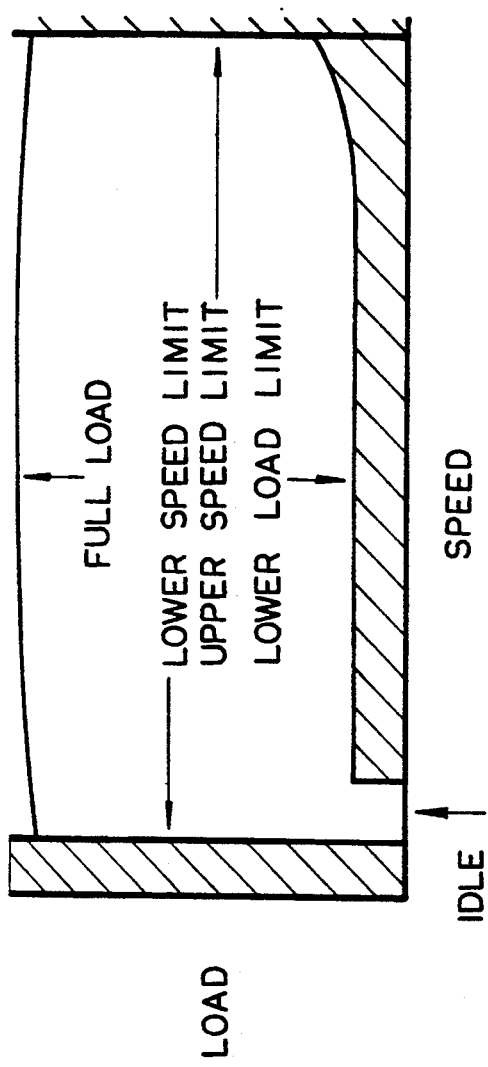
FIG. 10 shows a diagram in which the limit ranges of the load-speed map are indicated, within which pilot control of the thresholds takes place.

The engine operation characteristic map possesses limit ranges in which a recognition method for combustion misfires cannot be usefully applied. If these limit ranges are reached, a pilot control which establishes the thresholds at a higher value, as a function of the operating characteristic area, goes into effect. These critical limit ranges are shown with shading in FIG. 10. In particular, combustion misfire recognition is not practical in the range of the upper speed limitation, since there, the fuel supply is interrupted. This range is located at the right margin in FIG. 10, with shading. Another limit range is drawn with shading at the left margin of the characteristic area, where the engine speed lies far below the value of the idle speed. This limit case is reached, for example, if a high gear is improperly engaged while the vehicle is rolling slowly. In this operating state of the internal combustion engine, useful error recognition is no longer possible. Finally, in coasting operation with fuel shut-off, the pilot control also goes into effect, establishing higher thresholds in this case.

The recognition of combustion misfires takes place with the goal of warning the driver of increased pollutant emission due to misfires, as well as of danger to the catalytic converter, and letting him know that repair work should be carried out in the workshop. With regard to poor exhaust gas quality and catalytic converter damage, combustion misfires are all the more harmful when they occur at a higher engine speed and engine load. This dependence is taken into consideration in the calculation of the relative frequencies which result in an error display when a critical frequency threshold is exceeded, in that the combustion misfires which occur are weighted as a function of the load and speed.

Figure 11:
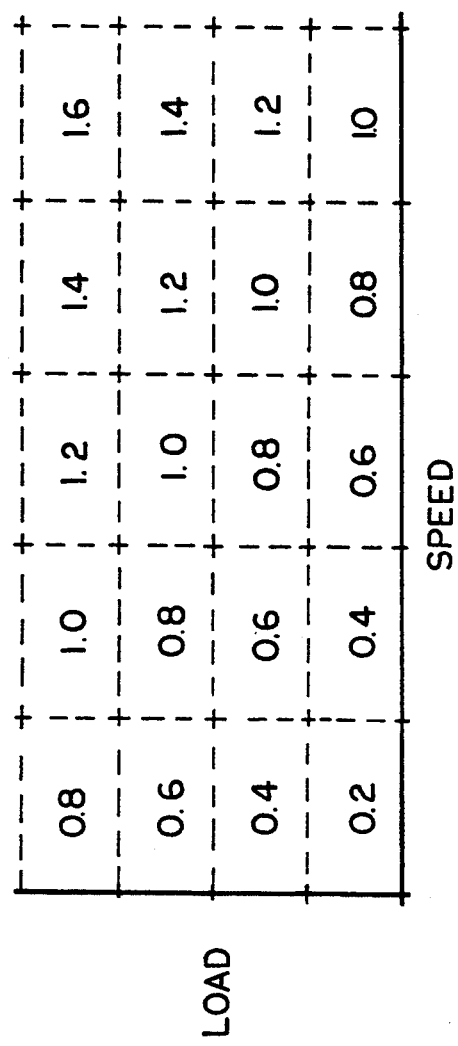
FIG. 11 shows a matrix from which the weight factors for combustion misfires are evident as a function of the load and speed.

In the calculation of the relative frequency, a predetermined number of engine revolutions (e.g. 1000) is selected as the reference value. If each combustion misfire were now to be assigned the same value, the error display would depend solely on the number of combustion misfires, without taking into consideration that combustion misfires in the lower load/speed range are less harmful than combustion misfires in the high load/speed range. Therefore, according to the invention, the combustion misfires are multiplied by weighting factors, dependent on the load and speed, before being added. FIG. 11 shows an example for a weighting matrix over the characteristic area. As compared with the normal value of 1, the combustion misfires in the lower load and speed range are multiplied by a factor of 0.2, which is increased with an increasing speed and load, and finally reaches a maximum value of 1.6.

In a further development of the method according to the invention, the misfire recognition is suppressed entirely during a time period which can be predetermined, if the processor unit receives a signal, via a sensor, from which it can be derived that the progression of the crank shaft speed is being influenced by influences from severe unevenness of the road, so that proper recognition of combustion misfires is no longer possible. This signal can be derived from suitable sensor signals already present in the vehicle, or generated using one or more additional path or acceleration transducers 21 (FIG. 1).

I claim:

1. Method for monitoring power output of individual cylinders of a multicylinder internal combustion engine having a predetermined crank shaft position, wherein
    a) the crank shaft position is identified, and an instantaneous speed is determined during the cycle of each cylinder for a certain crank shaft rotation angle, and is squared ($n^2$),
    b) within each cycle of the internal combustion engine, proportion of change between consecutive values of $n^2$, on the basis of a mean increase or decrease in $n^2$ during a cycle, which results from a difference between the $n^2$ value to ignition top dead center of a cylinder within the cycle, and the $n^2$ value of the same cylinder to its subsequent ignition top dead center, is subtracted from the actual $n^2$ values determined pursuant to a), to form dynamically corrected $n^2$ values,
    c) for each cylinder, difference between the corrected $n^2$ value to the ignition top dead center of this cylinder and a corrected $n^2$ value to the ignition top dead center of the next cylinder in the firing sequence is formed,
    d) the difference values are compared with predetermined thresholds to recognize incorrect power input, and
    e) relative frequencies of incorrect power outputs in all cylinders are determined, where in case a critical frequency threshold is exceeded, an error display is triggered.

2. Arrangement for implementing the method pursuant to claim 1, with
    a) a first device for identifying the crank shaft position, and
    b) a second device for detecting the instantaneous speed of the internal combustion engine over a certain crank shaft rotation angle during the cycle of each cylinder, characterized by
    c) a third device for calculating the square of the instantaneous speed determined,
    d) a fourth device for dynamic correction, by means of calculations, of the instantaneous speed squares, by subtraction of the mean linear increase or decrease in $n^2$ during a cycle of the internal combustion engine, which results from the difference between the $n^2$ value to the ignition top dead center of a cylinder within the cycle, and the $n^2$ value of the same cylinder to its subsequent ignition top dead center, from the actual $n^2$ values determined pursuant to c) during this cycle,
    e) a fifth device for determining the difference, by means of calculations, between the corrected $n^2$ values to the ignition top dead center of each cylinder, and the corrected $n^2$ value to the ignition top dead center of the subsequent cylinder in the firing sequence, f) a sixth device for comparing the difference values with predetermined thresholds for recognition of incorrect power output, and g) a seventh device for determining the relative frequency of incorrect power output in all cylinders, where an error display is triggered if a critical frequency threshold is exceeded.

3. Arrangement pursuant to claim 2, wherein a first pilot control device with
   a) an eighth device for calculating the change in load and/or speed within a predetermined time interval,
   b) a ninth device for comparing the calculated change with limits that can be predetermined, and
   c) a tenth device for increasing the predetermined threshold when a limit is exceeded.

4. Arrangement pursuant to claim 2, wherein a second pilot control device with
   a) an eleventh device for comparing the instantaneous speed and/or instantaneous load with lower and/or upper limits that can be predetermined, and
   b) a twelfth device for increasing the predetermined threshold over a time period that can be predetermined, if the lower or upper limit is exceeded.

5. Arrangement pursuant to one of claim 2, wherein a third pilot control device with
   a) a thirteenth device for forming the difference between consecutive thresholds,
   b) a fourteenth device for comparing the difference with difference limits that can be predetermined, in case of a decreasing threshold, and
   c) a fifteenth device for limiting the change velocity of the thresholds when a difference limit is exceeded, in such a way that the decrease from a threshold to the next corresponds maximally to the difference limit that can be predetermined.

6. Arrangement pursuant to claim 2, wherein all devices are integrated in a common processor unit.

7. Method for monitoring power output of individual cylinders of a multicylinder internal combustion engine having a predetermined crank shaft position wherein
   a) the crank shaft position is identified, and an instantaneous speed is determined during the cycle of each cylinder, and is squared ($n^2$),
   b) for each cylinder, a difference between an actual $n^2$ value determined pursuant to a) to ignition top dead center of this cylinder and the $n^2$ value to the ignition top dead center of the next cylinder in the firing sequence is formed,
   c) this difference is corrected by a mean increase or decrease in $n^2$ during a cycle of the internal combustion engine, which results from the difference between $n^2$ value to the ignition top dead center of a cylinder within the cycle, and the $n^2$ value of the same cylinder to its subsequent ignition top dead center,
   d) the corrected difference values are compared with predetermined thresholds to recognize incorrect power output, and
   e) relative frequencies of incorrect power outputs in all cylinders are determined, where in case a critical frequency threshold is exceeded, an error display is triggered.

8. Method pursuant to claim 1 or 7, wherein the predetermined thresholds are established as a function of the load and the speed of the internal combustion engine.

9. Method pursuant to claim 1 or 7, wherein the determination of the instantaneous speed essentially takes place over a crank shaft rotation angle which corresponds to the firing interval.

10. Method pursuant to claim 1 or 7, wherein
    a) the change in load and/or speed is calculated within a time which can be predetermined,
    b) the calculated change is compared with limits which can be predetermined,
    c) when a limit is exceeded, the predetermined threshold is increased over a time period which can be predetermined.

11. Method pursuant to claim 10, wherein the limits which can be predetermined and/or the time period which can be predetermined are established as a function of the operating state of the internal combustion engine.

12. Method pursuant to claim 1 or 7, wherein
    a) the instantaneous speed and/or the instantaneous load are compared with lower and upper limits which can be predetermined, and
    b) if a lower or upper limit which can be predetermined is exceeded, the predetermined threshold is increased over a period of time that can be predetermined.

13. Method pursuant to claim 12, wherein the limits which can be predetermined and/or the time period which can be predetermined are established as a function of the operating state of the internal combustion engine.

14. Method pursuant to claim 1 or 7, wherein
    a) the difference between two consecutive thresholds is formed,
    b) with a decreasing threshold, the difference is compared with difference limits that can be predetermined, and
    c) if a difference limit is exceeded, the change velocity of the threshold is limited, in such a way that the decrease from one threshold to the next corresponds to a maximum of the difference limit that can be predetermined.

15. Method pursuant to claim 14, wherein the difference limits for consecutive thresholds are established as a function of the operating state of the internal combustion engine.

* * * * *